(12) United States Patent
Käch et al.

(10) Patent No.: US 7,284,572 B2
(45) Date of Patent: Oct. 23, 2007

(54) VALVE

(75) Inventors: Robert Käch, Sursee (CH); Christian Kissling, Fulenbach (CH)

(73) Assignee: KNF Flodos AG, Sursee (CH)

(*) Notice: Subject to any disclaimer, the term of this patent is extended or adjusted under 35 U.S.C. 154(b) by 166 days.

(21) Appl. No.: 11/034,120

(22) Filed: Jan. 12, 2005

(65) Prior Publication Data

US 2005/0155657 A1 Jul. 21, 2005

(30) Foreign Application Priority Data

Jan. 15, 2004 (DE) ................... 10 2004 002 078

(51) Int. Cl.
*F16K 15/14* (2006.01)
(52) U.S. Cl. ..................... 137/859; 417/566
(58) Field of Classification Search ............... 137/859; 417/566, 569, 571
See application file for complete search history.

(56) References Cited

U.S. PATENT DOCUMENTS

| 3,123,096 | A | | 3/1964 | Notaro et al. |
| 3,270,771 | A | | 9/1966 | Morgan et al. |
| 4,182,355 | A | | 1/1980 | Briel et al. |
| 5,213,125 | A | * | 5/1993 | Leu ..................... 137/15.18 |
| 5,609,476 | A | * | 3/1997 | Kim et al. ............... 417/447 |
| 5,617,897 | A | | 4/1997 | Myers |
| 5,727,594 | A | | 3/1998 | Chokski |
| 5,771,935 | A | | 6/1998 | Myers |
| 5,775,887 | A | * | 7/1998 | Park et al. ............... 417/569 |
| 5,875,819 | A | * | 3/1999 | Hwang .................... 137/856 |
| 5,971,723 | A | | 10/1999 | Bolt et al. |
| 6,044,862 | A | * | 4/2000 | Schumann et al. ........ 137/512 |
| 6,089,272 | A | | 7/2000 | Brand et al. |
| 6,390,130 | B1 | | 5/2002 | Guala |
| 6,579,075 | B2 | * | 6/2003 | Lee et al. ............... 417/312 |
| 6,823,891 | B2 | * | 11/2004 | Schulze et al. .......... 137/512 |
| 2003/0089409 | A1 | | 5/2003 | Morimoto |

FOREIGN PATENT DOCUMENTS

| DE | 667 675 | 11/1938 |
| DE | 102 19 994 | 12/2003 |
| EP | 0 336 307 | 10/1989 |
| EP | 1 253 320 | 10/2002 |

* cited by examiner

*Primary Examiner*—Ramesh Krishnamurthy
(74) *Attorney, Agent, or Firm*—Volpe and Koenig, P.C.

(57) ABSTRACT

A plate valve, especially for diaphragm pumps, having a valve plate (8), a valve seat (15), and a valve chamber bounded by a valve housing is provided, with the valve plate being held at the edges thereof. The valve plate (8) is preset under tension elastically in the installation position between outer edge holding devices, with the elastic pretensioning being at least large enough that deformations due to edge clamping can be compensated. Preferably, the valve plate (8) is held at the edge in a positive fit and is preset under tension elastically between its outer edge holding devices in the installation position.

15 Claims, 3 Drawing Sheets

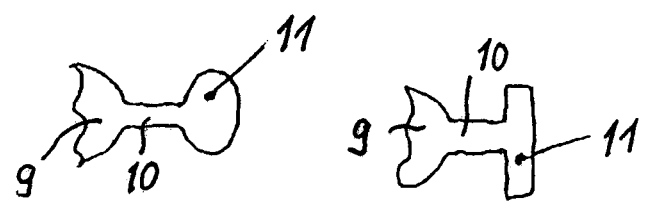
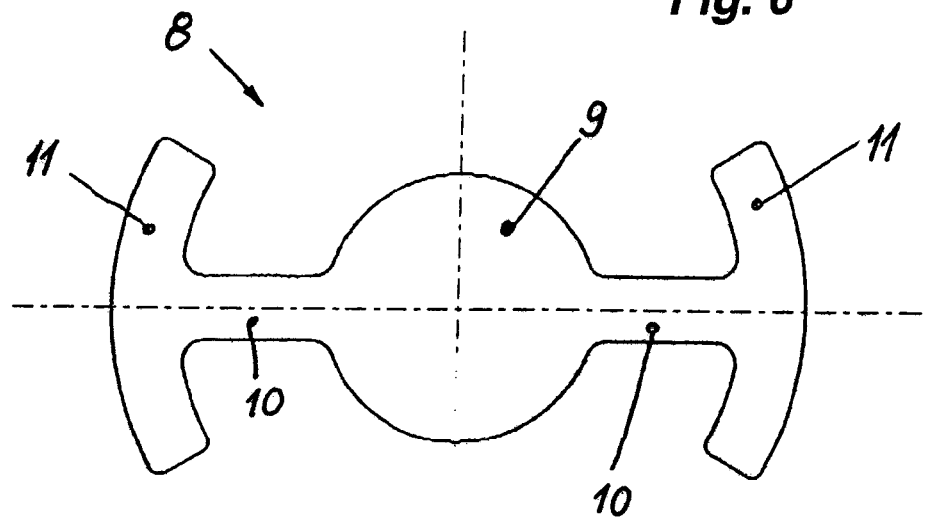
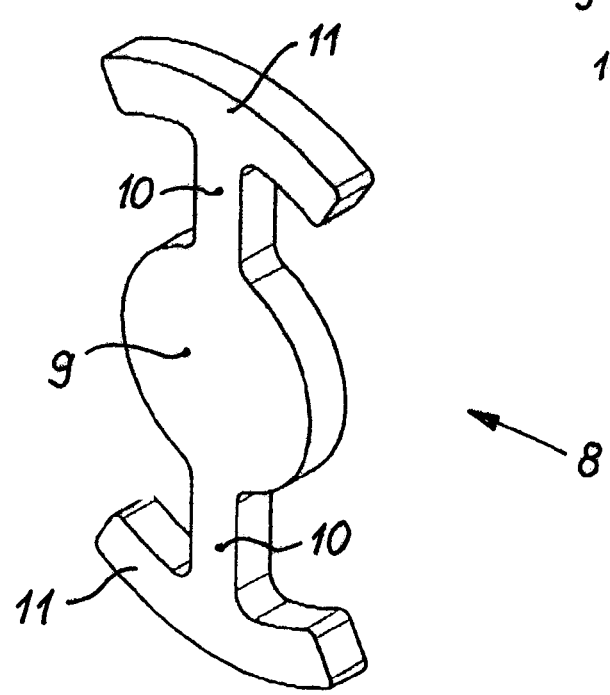

VALVE

BACKGROUND

The invention relates to a valve, especially a plate valve, for example, for diaphragm pumps, with a valve plate, a valve seat, and a valve chamber bounded by a valve housing, with the valve plate being held at the edges.

Valves of this type are already known. In combination with the valve seat, the valve plate used in plate valves has the task of providing a passive valve function triggered by the flow and pressure difference, as required in diaphragm pumps or non-return valves.

In the already known valves, in addition to its actual function, namely forming a seal with the valve seat, the valve plate also fulfills additional functions, such as, for example, sealing the valve housing from the outside. For this purpose, there are regions, which fulfill these functions, on the valve plate. In particular, in the installation of such valve plates combining such a sealing function, an undefined installation position or stress in the actual valve plate can result during installation due to squeezing in the seal regions outwards primarily due to the lack of compressibility of rubber, which is often used. Solutions to reduce this stress by means of stress-reducing grooves are known, but are not sufficient, especially for small pumps or micro-pumps and the tight tolerances necessary with these devices. In this range, very small dimensional deviations can produce disadvantageous effects on the correct valve function, that is, on the correct position of the valve plate relative to the valve seat and the sealing capability of both elements.

SUMMARY

Therefore, there is the objective of creating a valve, which can be used especially in small pumps or micro-pumps and can be mounted easily and repeatedly without a problem.

For solving this objective, according to the invention the valve plate is preset under tension elastically in the installation position within its plate plane and the elastic pretensioning is at least large enough so that deformations due to edge clamping are compensated.

This configuration effectively prevents material displacements due to edge clamping of the valve plate from having disadvantageous effects on the position of the part of the valve plate interacting with the valve seat. Even for the tight spatial requirements present in such pumps and the minimal distance between the valve plate's active part, which interacts with the valve seat and which may not be deformed, and its outer clamping zone, through the measures according to the invention, a constant, correct clamping of the valve plate is achieved without additional space requirements.

According to another aspect of the invention, the valve plate is held in a positive fit at the edges and preset under tension elastically between its outer edge holding devices in the installation position.

This embodiment prevents edge deformations from the front inwards due to the positive-fit holding. Therefore, no edge squeezing pressure is produced, which could lead to material displacement into the active region of the valve plate.

The pretensioning of the valve plate leads to the result that the valve plate assumes a defined starting position in an unloaded state. Thus, when the valve plate is deflected due to a pressure difference, a forced return into the starting position is realized during operation and a sealing function is realized at a standstill, which prevents, in a desired way, a return flow of feed medium.

This sealing function is supported when the valve seat projects past the plane of the edge holding device of the valve plate, thus, somewhat offset to the valve plate, so that the valve plate acts on the valve seat in the rest position of the valve. Thus, for simultaneous pretensioning in the plane of the valve plate, a force vector is produced in the direction of the valve seat, so that an improved sealing effect between the valve plate and the valve seat is achieved even for very small pressure differences or when the pump is at a standstill.

Preferably, the valve plate has a plate-shaped closing body and lateral valve plate connecting pieces connected to the closing body with anchor elements located on its ends for holding in or on the valve housing.

In this way, the closing body is connected to the anchor elements via the valve plate connecting pieces and thus suspended so that it can also move easily between the open position and the closed position due to small pressure differences. Here, it should be mentioned that it is sufficient when the provided pretensioning realizes an elastic deformation essentially in the connecting pieces. This is aided by a small cross section of the connecting pieces relative to the closing body, but can also be achieved in a targeted way by material differences and/or thickness differences in the transverse profile of the valve plate. For example, the connecting pieces could be made from elastic material and the valve plate could be made from comparatively less elastic or even inelastic material.

According to a preferred embodiment, at least two valve connecting pieces are provided. Preferably the two valve connecting pieces are arranged diametrically opposite the closing body and are each provided with an anchor element.

The lateral connecting pieces and the anchor elements are here connected in one piece with the closing body as components of the valve plate. The valve plate can be made from, for example, a rubber part or a part formed from rubber-elastic material.

For a positive-fit holding of the valve plate, the anchor elements have a shape that is offset by 90° or thicker relative to the valve connecting piece and are formed together with the corresponding valve connecting piece, especially L-shaped, T-shaped, or similarly anchor-shaped or somewhat circular or spherical.

The configuration of the anchor elements that is used is tailored, among other things, to the existing space relationships.

For generating elastic pretensioning within the plate plane, there is a holding device belonging to the valve for the valve plate, which has receptacles for the anchor elements of the valve plate, with the distance of the anchor element receptacles being greater than the distance of the anchor elements of the valve plate in the non-tensioned position. The tensioning is established during insertion of the valve plate into the holding device.

The extent of the valve seat offset relative to the flat tensioning position of the valve plate between the receptacle elements can be relatively small.

BRIEF DESCRIPTION OF THE DRAWINGS

In the following, embodiments of the invention are described in more detail. In the drawings, shown in partially schematic form are:

FIG. 4 is a top view of a valve plate with closing body, connecting pieces, and anchor elements, FIGS. 5 and 6 are views of different anchor elements of a valve plate, FIG. 7 is a view of an anchor element receptacle with anchor element located in the tensioned position, and FIG. 8 is a perspective view of the valve plate shown in FIG. 4.

DETAILED DESCRIPTION OF THE PREFERRED EMBODIMENTS

Figure 1:
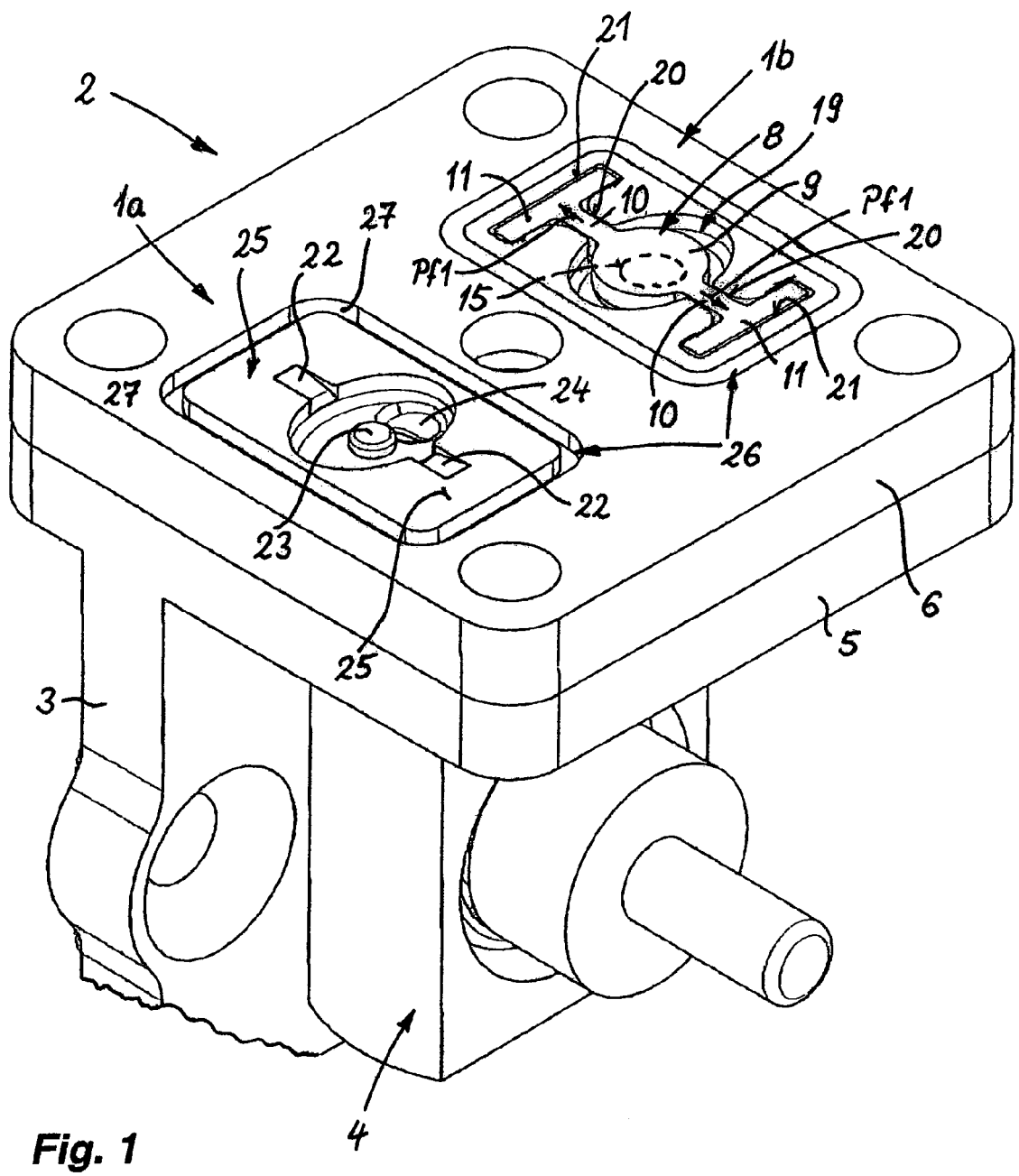
FIG. 1 is a perspective view of a part of a diaphragm pump with open pump head and parts of an outlet valve and an inlet valve located therein.

In FIG. 1, a valve according to the invention is shown as a part of an inlet valve 1a and also an outlet valve 1b. These valves are part of a pump head 2 of a partially shown diaphragm pump, of which a part of the motor housing 3 and also the piston-stroke drive 4 can be seen. The motor housing 3 has an attachment flange 5, to which the pump head 2 containing the valve is mounted. This pump head 2 has head plates, which are shaped according to the outline of the attachment flange 5 and of which only a base plate 6 can be seen in the embodiment according to FIG. 1. Not shown is a cover plate, which can be set on the base plate 6 and which has parts of the inlet valve 1a and parts of the outlet valve 1b similarly facing the base plate 6, so that the paired, opposing parts each form a complete valve in the two plates, each together with a valve plate 8.

Figure 2:
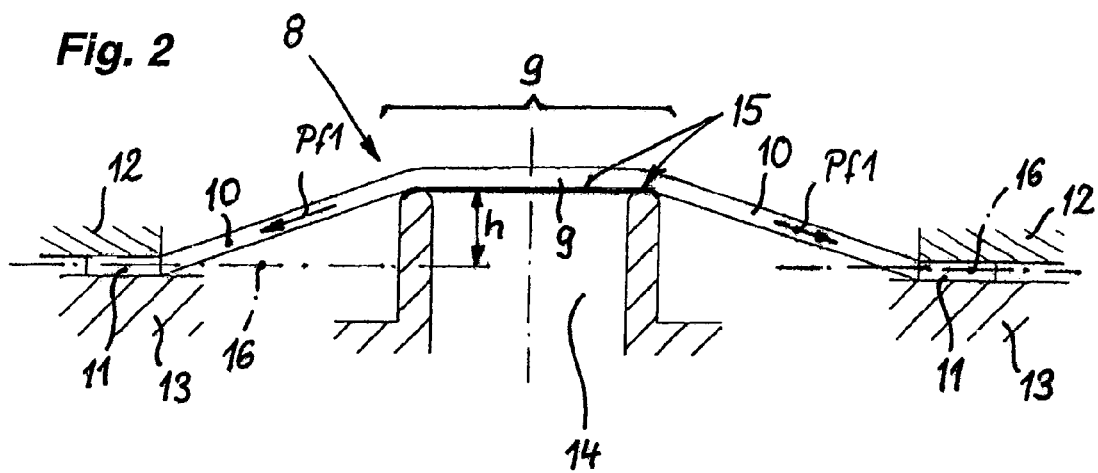
FIG. 2 is a schematic view of a valve in longitudinal section with a valve plate tensioned in a valve housing in closed or rest position.
Figure 3:
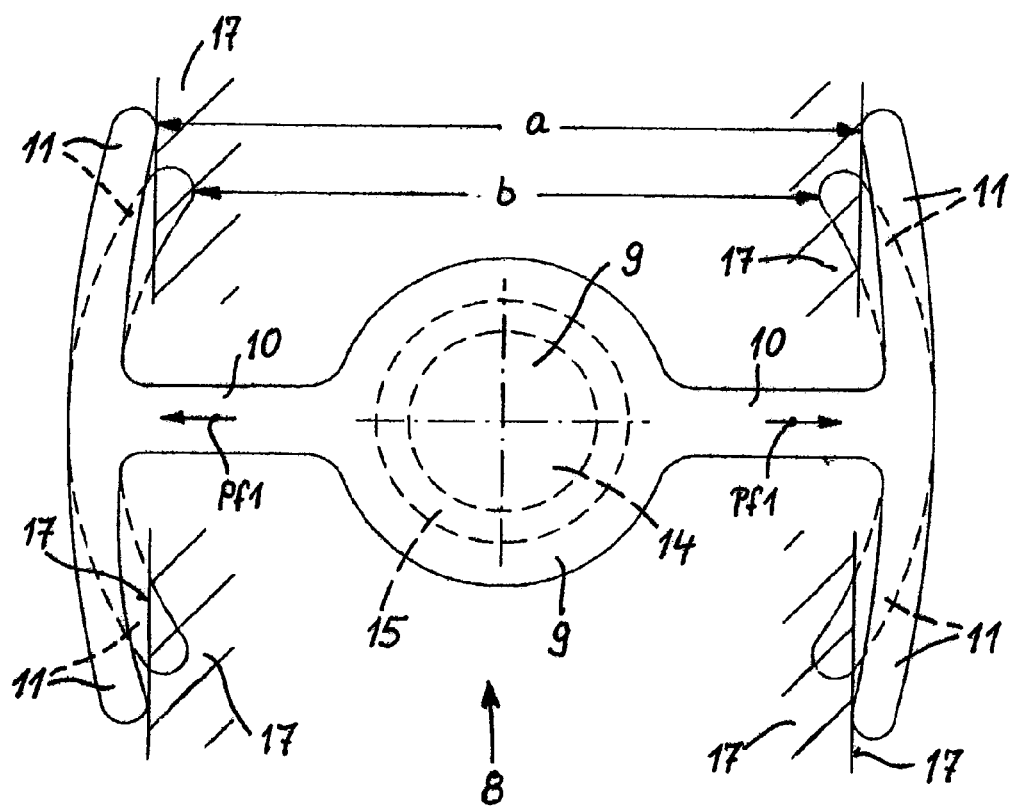
FIG. 3 is a top view of a positive fit-held valve plate.

The valves include the valve plate 8, which can be seen in FIGS. 1 to 4 and FIG. 8 and which is preset under tension elastically in the installation position, as indicated by the arrows Pf1 in FIGS. 1 to 3. The valve plate 8 essentially comprises a central closing body 9, which is connected to two valve connecting pieces 10 attached to the closing body 9 diametrically opposite and which have anchor elements 11 in their outer ends (FIG. 4).

In FIG. 2, anchor elements 11 are shown, which are formed by extensions of the valve connecting piece 10 and which are clamped between two housing parts 12 and 13. The housing parts 12 and 13 can be formed by two head plates, especially the base plate 6 and the cover plate from FIG. 1.

Instead of this clamping, preferably the anchor elements 11 are held by a positive fit, as can be seen in FIGS. 1, 3, and 7. Both the valve plate held by clamping and also the valve plate held by a positive fit are pretensioned according to the arrows Pf1. In this way, deformations of the valve plate edge or the anchor elements due to edge clamping (FIG. 2) can be compensated and do not have negative effects on the closing body 9. Furthermore, the valve plate is always located in the original position without the force of pressure.

In FIG. 2 it can be seen that a feed channel 14 ends at one side of the valve plate 8. The opening of this feed channel forms a valve seat 15, which can receive force from the valve plate 8 or its closing body 9. Preferably, in the original position the closing body 9 acts on the valve seat 15 and thus seals the feed channel 14. Thus, a corresponding return-flow seal is created. To improve the sealing function, the valve seat 15 can project past the plane 16 of the edge holding device of the valve plate 8, so that the valve seat is charged under pretensioning pressure by the pretensioning (arrow Pf1) of the valve plate 8 or the closing body 9 acting on the valve plate 8. In FIG. 2, for a clearer view, the extension h of the valve seat 15 past the plane 16 is shown at somewhat of a greater scale. In a micro-pump with a valve plate, which has a closing body of, for example, 2.5 mm diameter, a smaller extension h of the valve seat 15 past the plane 16 is sufficient to achieve an adequate sealing effect. Here, the thickness of the valve plate can equal approximately 0.5 mm.

FIG. 3 shows a positive-fit holding device for the valve plate 8, with the anchor elements 11 embodied as transverse connecting pieces engaging behind wall sections 17. The anchor elements 11 are shown in the non-tensioned position with dashed lines, while the continuous lines show their position in the operating position, where the anchor elements 11 are held in a positive fit and wherein in this operating position the tensile stresses are established according to the arrows Pf1. This is achieved in that the distance a of the anchor element receptacles (wall section 17) is greater than the distance b of the anchor element in the tensioned position (dashed lines). The pretensioning is established according to the arrows Pf1 in that the valve plate 8 is used with its anchor elements 11 to engage behind the wall sections 17.

The shaping of the anchor element 11 is preferably as in FIGS. 1, 3, 4, and 8, wherein, however, there is also the possibility instead of this shaping, to provide T-shaped, L-shaped, circular, or spherical anchor elements formed together with the valve connecting pieces 10. FIG. 5 shows one such variant, in which the anchor element 11 is embodied with a circular disk shape, optionally also with a spherical shape. T-shaped anchor elements with rounded profile as shown in FIGS. 3, 4, and 8 or with straight profile, as shown in FIGS. 1 and 6, can be embodied. In the curved embodiments, the pretensioning force can be generated such that for positive-fit receiving of the anchor elements 11, straight receptacles, as shown in FIG. 3, are provided, so that the pretensioning is established by deforming the anchor element 11 in the direction towards a straight shape. However, there is also the possibility to provide receptacles for the anchor element 11, which correspond in profile approximately to the non-tensioned profile of the anchor elements 11, but have a greater distance a from each other than opposing anchor elements 11.

FIG. 7 shows an illustration, in which the pretensioning is achieved by support knobs 18, through which the anchor elements 11 are bent somewhat from their non-tensioned position, so that in this way, the tensile stress within the valve plate or at least the valve connecting piece 10 is established.

In FIG. 1, in a preferred embodiment, the position of a positive-fit held valve plate 8 as a part of the outlet valve 1b can be seen well. In the base plate 6 of the pump head 2, there are moldings for planar, approximately flush reception of the valve plate 8.

Here, in the center there is a recess 19 with an approximately larger diameter than that of the here round closing body 9 of the valve plate. Within this recess, the closing body 9 can move back and forth between a closed position and an open position. The valve seat 15 of a feed channel connected to the pumping chamber, wherein this valve seat is located underneath the closing body 9, can be seen with the dashed lines. The closing body 9 contacts the valve seat 15 in a sealed manner in the rest position and during the suction phase of the pump.

Receiving grooves 20 for the valve connecting pieces 10, which transition into receiving recesses 21 for the anchor elements 11, connect to the recess 19 on the side. The depth of the receiving grooves 20 and also the receiving recesses 21 approximately correspond to the thickness of the valve plate 8, so that on one hand this is held by a positive fit and on the other hand it closes approximately with the top side of the base plate 6. The depth of these moldings is preferably dimensioned so that when the cover plate is placed, a minimal gap is produced, so that except for the pretensioning by the anchor elements, no other forces act on the valve. The installation is especially simple and independent of tolerances. The valve function is therefore especially reliable in terms of processing.

In the cover plate not shown here, which is located above the base plate 6 in the functional position, there are counter-moldings provided opposite the moldings in the base plate 6, with these counter-moldings appearing for the outlet valve 1b somewhat like the moldings in the base plate 6 for forming an inlet valve 1a, while the counter-moldings provided in the cover plate for the inlet valve 1a correspond approximately to the shapes provided for the outlet valve 1b in the base plate 6.

The counter-molding in the cover plate for forming the outlet valve 1b has a central recess corresponding approximately to the recess 19, which enables the closing body 9 to move into the open position. Projection moldings 22 connect to the recess belonging to the counter-molding of the cover plate, as also provided in the moldings for forming the inlet valve 1a in the base plate 6. Likewise, in the not shown cover plate, the counter-molding of the outlet valve 1b can have a support knob 23 and also an opening 24, which is provided in the region of the recess and which leads to an outlet port. In principle, these parts would also be comparable with those of the inlet valve 1a in the base plate 5. However, in the inlet valve 1a, the opening 24 leads to the pumping chamber. The previously mentioned projection moldings in the counter-molding of the counter-molding opposite the outlet valve 1b (cf. projection moldings 22 of the inlet valve 1a in the base plate 6) lead outwards to cover surfaces 25, likewise comparable with those of the inlet valve 1a of the base plate 6.

The moldings provided in the head plates, thus in the base plate 6 and in the cover plate that can be placed on this base plate, for forming the inlet and outlet valves and for receiving and holding valve plates 8 are each bounded by a sealing zone 26 for sealing each valve region and also the two adjacent head plates. In these sealing zones 26, there can be grooves 27 for receiving a sealing ring not shown here. In the embodiment, the groove 27 for bounding the region of the inlet valve 1a is embodied with such a depth that a sealing ring is inserted and held there and sealed either by the flat side of the cover plate that can be placed on top or an optionally less deep groove 27 also provided there. Practically complementary to this arrangement, for bounding the region of the outlet valve 1b in the sealing zone 26 in the cover plate not shown here, a somewhat deeper groove 27 is provided for receiving a sealing ring, while in the base plate 6, in turn, the flat side of this base plate 6 or a less deep groove 27 is provided. These seals bounding the valve regions provide a clear separation, on one hand, of the valve functions and, on the other hand, of the sealing function between the two adjacent head plates (base plate, cover plate).

The base plate 6 and the cover plate that can be placed on this base plate each with moldings and counter-moldings provided for forming the valve are preferably embodied as injection-molded parts. In this way, a constant, good manufacturing quality is guaranteed also for large quantities.

For the material of the valve plate, a rubber-like, elastic material is possible.

The invention claimed is:

1. A valve for diaphragm pumps, comprising a valve plate (8), having a plate-shaped closing body (9) and lateral valve connecting pieces (10) connected to the closing body having anchor elements (11) which form holding devices (11) located on ends thereof for holding in or on a valve housing, a valve seat (15), and a valve chamber bounded by a valve housing, with the valve plate being held by a positive fit at edges thereof, the valve plate (8) is preset under tension elastically acting in a plane of the valve plate in an installation position between outer edge holding devices, a holding device belonging to the valve is provided for the valve plate that includes receptacles for the anchor elements (11) of the valve plate (8) and a distance (a) between the anchor element receptacles is greater than a distance (b) between the anchor elements (11) of the valve plate, wherein the anchor elements (11) are not in direct contact with each other (8) in a non-tensioned position of the valve plate.

2. Valve according to claim 1, wherein the valve seat (15) projects past a plane of the edge holding device of the valve plate (8), so that the valve plate (8) exerts pressure on the valve seat (15) in a rest position of the valve.

3. Valve according to claim 1, wherein the lateral valve connecting pieces (10) and the anchor elements (11) are connected in one piece to the closing body.

4. Valve according to claim 1, wherein there are at least two of the lateral valve connecting pieces (10), and the at least two valve connecting pieces (10) are arranged at diametrically opposed positions on the closing body and are each provided with an anchor element.

5. Valve according to claim 1, wherein the anchor elements (11) have an angled shape relative to the valve connecting piece (10) and are embodied as L-shaped, T-shaped, anchor-shaped or approximately circular or spherical shapes connected with the corresponding valve connecting piece (10).

6. Valve according to claim 1, wherein the plate-shaped closing body (9) of the valve plate (8) has a round or rounded outline.

7. Valve according to claim 1, wherein the valve connecting pieces (10) connected to the plate-shaped closing body (9) of the valve plate (8) are clamped at outer ends thereof and the elastic pretensioning of the valve plate (8) is at least large enough that deformations due to this clamping are compensated and/or a distance of the clamping is so great that any occurring deformations lie outside the closing body (9).

8. A valve for diaphragm pumps, comprising:
   a valve plate (8), having a plate-shaped closing body (9) and lateral valve connecting nieces (10) connected to the closing body having anchor elements (11) which form holding devices (11) located on ends thereof for holding in or on a valve housing, a valve seat (15);
   part of a pump head of a pump, the pump head includes several head plates, and moldings for receiving and force-fit or positive-fit holding of two adjacent ones of the valve plates (8) in two adjacent head plates; and
   a valve chamber bounded by a valve housing, with the valve plate being held by a positive fit at edges thereof, the valve plate (8) is preset under tension elastically acting in a plane of the valve plate in an installation position between outer edge holding devices, a holding device belonging to the valve is provided for the valve plate that includes receptacles for the anchor elements (11) of the valve plate (8) and a distance (a) between the anchor element receptacles is greater than a distance (b) between the anchor elements (11) of the valve plate (8) in a non-tensioned position of the valve plate wherein the moldings provided in the head plates for receiving the valve plates (8) are each bounded by a sealing zone (26) arranged at a distance for sealing a valve region and also the adjacent head plate.

9. Valve according to claim 8, wherein a groove (27) for receiving a sealing ring is provided in the sealing zone (26) bounding the valve region.

10. Valve according to claim 8, wherein the moldings provided in the head plates for receiving the valve plates (8) each have a recess (19) for holding the plate-shaped closing body (9) for movement and anchor element receptacles connected at sides of the recess.

11. Valve according to claim 8, wherein the moldings include a first molding for receiving and a positive-fit holding of the valve plate (8) with planar, approximately flush receiving of the valve plate (8) and an other counter-molding at least for covering anchor element receptacles of the first molding located in adjacent ones of the head plates.

12. Valve according to claim 8, wherein one of the head plates forms a base plate (6), which has as part of an outlet valve (1*b*) a molding for planar, approximately flush receiving of the valve plate (8), a molded and shaped section is provided laterally next to an outlet valve molding as part of an inlet valve (1*a*) at least for covering anchor element receptacles of the molding located in the opposite head plate, and counter-moldings tailored to the moldings in the base plate are provided in the adjacent head plate forming a cover plate for the outlet valve on one side and in the inlet valve on the other side.

13. Valve according to claim 12, wherein in the molding in the one head plate, in a region of a recess (19) for receiving the closing body (9), there is a valve seat (15) that can receive force from the closing body of the valve plate (8) and in a region of a recess of the other head plate there is a piston-stroke stop (23) for the closing body (9) and also an inlet channel opening (24).

14. Valve according to claim 13, wherein the head plates with the moldings for the valve are injection-molded parts.

15. Valve according to claim 8, wherein the valve plate (8) comprises a rubber-like, elastic material.

* * * * *